US011678401B2

(12) United States Patent
Zhang et al.

(10) Patent No.: US 11,678,401 B2
(45) Date of Patent: Jun. 13, 2023

(54) TRANSMISSION TIMING INFORMATION SENDING METHOD, TRANSMISSION TIMING INFORMATION RECEIVING METHOD, AND APPARATUS

(71) Applicant: Huawei Technologies Co., Ltd., Shenzhen (CN)

(72) Inventors: Xu Zhang, Beijing (CN); Lixia Xue, Beijing (CN); Zukang Shen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/215,689

(22) Filed: Mar. 29, 2021

(65) Prior Publication Data
US 2021/0298121 A1  Sep. 23, 2021

Related U.S. Application Data

(63) Continuation of application No. 16/399,632, filed on Apr. 30, 2019, now Pat. No. 10,966,281, which is a (Continued)

(30) Foreign Application Priority Data

Nov. 3, 2016  (CN) .......................... 201610956629.2
Feb. 10, 2017  (CN) ......................... 201710074473.X

(51) Int. Cl.
*H04W 80/08* (2009.01)
*H04L 5/00* (2006.01)
(Continued)

(52) U.S. Cl.
CPC ........... *H04W 80/08* (2013.01); *H04L 1/1812* (2013.01); *H04L 1/1854* (2013.01);
(Continued)

(58) Field of Classification Search
CPC ..... H04W 80/08; H04W 8/24; H04W 72/042; H04W 72/0446; H04W 72/0453;
(Continued)

(56) References Cited

U.S. PATENT DOCUMENTS 10,966,281 B2 * 3/2021 Zhang .................. H04L 5/0082
2006/0215780 A1 * 9/2006 Yeon ................... H04L 27/2623
375/260

(Continued)

FOREIGN PATENT DOCUMENTS

CN   104335654 A   2/2015
CN   105246164 A   1/2016
(Continued)

OTHER PUBLICATIONS

Huawei, et al., "Discussion on timing relations for NR frame structure", 3GPP TSG RAN WG1 Meeting #86, R1-166106, Gothenburg, Sweden, Aug. 22-26, 2016, 4 pages.
(Continued)

*Primary Examiner* — Afshawn M Towfighi
(74) *Attorney, Agent, or Firm* — Slater Matsil, LLP

(57) ABSTRACT

A transmission timing information sending method, a transmission timing information receiving method, and an apparatus are provided. The method includes: configuring, by a base station, higher layer signaling, where the higher layer signaling includes at least one transmission timing set used to indicate a transmission timing value, and each of the at least one transmission timing set includes at least one transmission timing value; sending, by the base station, the higher layer signaling to a terminal; determining, by the base station, downlink control information (DCI), where the DCI is used to instruct the terminal to determine a transmission timing value in the at least one transmission timing set, and the determined transmission timing value is a slot that the
(Continued)

terminal is instructed to use when sending feedback information; and sending, by the base station, the DCI to the terminal.

24 Claims, 4 Drawing Sheets

Related U.S. Application Data continuation of application No. PCT/CN2017/108473, filed on Oct. 31, 2017.

(51) Int. Cl.
| | |
|---|---|
| *H04L 5/14* | (2006.01) |
| *H04W 8/24* | (2009.01) |
| *H04W 72/0446* | (2023.01) |
| *H04W 72/0453* | (2023.01) |
| *H04L 1/1829* | (2023.01) |
| *H04L 1/1812* | (2023.01) |
| *H04W 72/23* | (2023.01) |
| *H04B 7/26* | (2006.01) |

(52) U.S. Cl.
CPC .......... *H04L 1/1864* (2013.01); *H04L 5/0082* (2013.01); *H04L 5/1469* (2013.01); *H04W 8/24* (2013.01); *H04W 72/0446* (2013.01); *H04W 72/0453* (2013.01); *H04W 72/23* (2023.01); *H04B 7/2643* (2013.01)

(58) Field of Classification Search
CPC .. H04W 56/00; H04W 72/044; H04L 1/1864; H04L 1/1854; H04L 1/1812; H04L 5/0082; H04L 5/1469; H04L 5/0092; H04L 5/0007; H04L 5/0053; H04B 7/2643

See application file for complete search history.

(56) References Cited

U.S. PATENT DOCUMENTS

| | | | | |
|---|---|---|---|---|
| 2013/0322413 | A1* | 12/2013 | Pelletier | ............ H04W 72/0406 |
| | | | | 370/336 |
| 2019/0349067 | A1* | 11/2019 | Huang | .................. H04L 5/0025 |

FOREIGN PATENT DOCUMENTS

| | | |
|---|---|---|
| CN | 105430755 A | 3/2016 |
| EP | 2779514 A2 | 9/2014 |
| JP | 2015065605 A | 4/2015 |
| JP | 2015065622 A | 4/2015 |

OTHER PUBLICATIONS

Huawei, et al., "Discussion on timing relations for NR frame structure", 3GPP TSG RAN WG1 Meeting #86, R1-166105, Gothenburg, Sweden, Aug. 22-26, 2016, 4 pages.

Intel Corporation, "NR HARQ and scheduling timing", 3GPP TSG-RAN WG1 #86bis, R1-1609542, Lisbon, Portugal, Oct. 10-14, 2016, total 4 pages.

Samsung, "Support of Flexible Scheduling Timing", 3GPP TSG-RAN WG1 #86bis, R1-1609133, Lisbon, Portugal, Oct. 10-14, 2016, total 5 pages.

LG Electronics, "Discussion on minimum HARQ-ACK and retransmission timing", 3GPP TSG RAN WG1 Meeting #86, Gothenburg, Sweden, Aug. 22-26, 2016, R1-166880, 4 pages.

NTT Docomo, Inc., "HARQ and scheduling operation for NR", 3GPP TSG RAN WG1 Meeting #86bis Lisbon, Portugal, Oct. 10-14, 2016, R1-1610084, 8 pages.

* cited by examiner

TRANSMISSION TIMING INFORMATION SENDING METHOD, TRANSMISSION TIMING INFORMATION RECEIVING METHOD, AND APPARATUS

CROSS-REFERENCE TO RELATED APPLICATIONS

This application is a continuation of U.S. patent application Ser. No. 16/399,632, filed on Apr. 30, 2019, now U.S. Pat. No. 10,966,281, which is a continuation of International Application No. PCT/CN2017/108473, filed on Oct. 31, 2017, which claims priority to Chinese Patent Application No. 201610956629.2, filed on Nov. 3, 2016 and Chinese Patent Application No. 201710074473.X, filed on Feb. 10, 2017. All of the aforementioned patent applications are hereby incorporated by reference in their entireties.

TECHNICAL FIELD

The present invention relates to the field of communications technologies, and in particular, to a transmission timing information sending method, a transmission timing information receiving method, and an apparatus.

BACKGROUND

In an existing system (for example, an LTE system), a base station and user equipment exchange data and information with each other through frequency division duplex (FDD) or time division duplex (TDD). A transmission timing relationship used during communication between a base station and a terminal is predefined and obtained by the base station and the terminal. Transmission timing may be an interval between sending downlink data by the base station and sending uplink acknowledgement feedback information by the terminal, and is, for example, hybrid automatic repeat request (HARQ) timing, or may be an interval between sending uplink scheduling indication information by the base station and sending uplink data by the terminal. For example, during FDD-based transmission, the base station sends downlink data in a subframe n, and the terminal feeds back acknowledgement/negative acknowledgement (ACK/NACK) information of a data packet in a subframe n+4, and therefore transmission timing information or HARQ timing information is four subframes.

Similarly, during TDD-based transmission, when an initial subframe of a data packet sent by the base station is n, it is usually specified that the terminal feeds back ACK/NACK information in a subframe n+4. Because uplink subframe and downlink subframe configurations (simply referred to as uplink downlink subframe configurations) in a radio frame are different, it is difficult to feed back information in the subframe n+4 at any time. Therefore, the standard predefines HARQ timing information for a specified uplink downlink subframe configuration.

In a next generation wireless communications system, types of services supported and application scenarios are diversified. In addition, types of uplink and downlink subframes in a radio frame dynamically change in a case of dynamic TDD. This causes an increase in a quantity of transmission timing relationships. Using the predefined manner will cause a decrease in system flexibility, and in this case, a design requirement of a next generation system cannot be satisfied. If downlink control information (DCI) is used to indicate transmission timing, relatively long information bits need to be predefined in the DCI, to include all possible timing relationships. This results in an increase in control signaling overheads.

SUMMARY

Embodiments provide transmission timing information sending method, transmission timing information receiving method, and an apparatus that is configured to improve flexibility of a transmission timing resource configuration and to reduce overheads of downlink control information.

According to a first aspect, a transmission timing information sending method is provided, including: configuring, by a base station, higher layer signaling, where the higher layer signaling includes at least one transmission timing set used to indicate a transmission timing value, each of the at least one transmission timing set includes at least one transmission timing value, and the at least one transmission timing set is related to at least one of the following factors: a subcarrier width, a TDD manner, and a terminal capability; sending, by the base station, the higher layer signaling to a terminal; determining, by the base station, downlink control information (DCI), where the DCI is used to instruct the terminal to determine a transmission timing value in the at least one transmission timing set, and the determined transmission timing value is a slot that the terminal is instructed to use when sending feedback information; and sending, by the base station, the DCI to the terminal.

According to the method for indicating transmission timing by jointly using the higher layer signaling and the downlink control information (DCI) in this aspect, the at least one transmission timing value set is configured in the higher layer signaling in advance, and the DCI is used to instruct to select the specific transmission timing value in the set. Value elements in each transmission timing set are determined based on factors such as a current service status of a system and a subframe configuration; therefore, when the terminal receives the higher layer signaling including the at least one transmission timing set, the base station only needs to use the DCI to carry an indication of the transmission timing value of the terminal. This avoids carrying relatively long information bits, and reduces control information overheads.

In addition, at least one transmission timing values are configured in each transmission timing set. This further increases diversity of transmission timing value selection for the base station and improves flexibility of a transmission timing configuration.

With reference to the first aspect, in a first implementation of the first aspect, that the DCI is used to instruct the terminal to determine a transmission timing value in the at least one transmission timing set includes: a DCI format of the DCI includes a first information field, and a transmission timing value in a transmission timing set is indicated based on the first information field. When the at least one transmission timing set is at least two transmission timing sets, that the DCI is used to instruct the terminal to determine a transmission timing value in the at least one transmission timing set further includes one of the at least one transmission timing set is determined based on the DCI format of the DCI, the DCI format includes a first information field, and the first information field is used to indicate a transmission timing value in the set with a binding relationship; or sending is performed on a control channel time-frequency resource occupied by the DCI, and at least one of the at least two transmission timing set is determined based on the control channel time-frequency resource.

With reference to the first aspect, in a second implementation of the first aspect, that the DCI is used to instruct the terminal to determine a transmission timing value in the at least one transmission timing set includes: a DCI format of the DCI includes a first information field, and a transmission timing value in a transmission timing set is indicated based on the first information field. When the at least one transmission timing set is at least two transmission timing sets, that the DCI is used to instruct the terminal to determine a transmission timing value in the at least one transmission timing set further includes: the DCI format of the DCI further includes a second information field, and one of the at least one transmission timing set is determined based on the second information field.

With reference to the first aspect, in a third implementation of the first aspect, the at least one transmission timing set includes a first subcarrier set, and a transmission timing value in the first subcarrier set depends on a subcarrier width. When the subcarrier width changes, the corresponding transmission timing value in the first subcarrier set changes accordingly.

With reference to the first aspect, in a fourth implementation of the first aspect, the at least one transmission timing set includes a first subcarrier set and a second subcarrier set, a transmission timing value in the first subcarrier set is determined based on a first subcarrier width, a transmission timing value in the second subcarrier set is determined based on a second subcarrier width, and at least one of the transmission timing value in the first subcarrier set is different from the transmission timing value in the second subcarrier set.

With reference to any one of the first aspect or the first to the third implementations of the first aspect, in a fourth implementation of the first aspect, the sending the DCI to the terminal includes: sending, by the base station, the DCI to the terminal over a primary control channel; or sending, by the base station, the DCI to the terminal over a primary control channel and a secondary control channel, where the DCI is located on the secondary control channel.

With reference to any one of the first aspect or the first to the third implementations of the first aspect, in a fifth implementation of the first aspect, the transmission timing value is one or more of the following: information about an interval between sending downlink data to the terminal by the base station and receiving, by the base station, uplink acknowledgement information sent by the terminal; or information about an interval between sending uplink scheduling information to the terminal by the base station and sending uplink data by the terminal, where the information about the interval includes a quantity of slots.

According to a second aspect, a transmission timing information receiving method is provided. The method includes: receiving, by a terminal, higher layer signaling and downlink control information (DCI) from a base station, where the higher layer signaling includes at least one transmission timing set used to indicate a transmission timing value, each of the at least one transmission timing set includes at least one transmission timing value, the DCI is used to instruct the terminal to determine a transmission timing value in the at least one transmission timing set, and the at least one transmission timing set is related to at least one of the following factors: a subcarrier width, a TDD manner, and a terminal capability; and determining the transmission timing value in the at least one transmission timing set based on the DCI, and sending feedback information in a slot corresponding to the determined transmission timing value.

With reference to the second aspect, in a first implementation of the second aspect, the determining the transmission timing value in the at least one transmission timing set based on the DCI includes: determining, by the terminal, one of the at least one transmission timing set based on a format of the DCI; and determining the transmission timing value in the determined transmission timing set based on indication information carried in an information field included in the DCI.

With reference to the second aspect, in a second implementation of the second aspect, if the terminal obtains the DCI over a primary control channel and a secondary control channel, the determining the transmission timing value in the at least one transmission timing set based on the DCI includes: obtaining, by the terminal, resource scheduling indication information from the primary control channel; determining a time-frequency resource location of the secondary control channel based on the resource scheduling indication information; and determining the transmission timing value in the at least one transmission timing set based on the DCI carried in the time-frequency resource location of the secondary control channel.

According to a third aspect, a base station is further provided. The base station includes: a processing unit, configured to configure higher layer signaling, where the higher layer signaling includes at least one transmission timing set used to indicate a transmission timing value, each of the at least one transmission timing set includes at least one transmission timing value, and the at least one transmission timing set is related to at least one of the following factors: a subcarrier width, a TDD manner, and a terminal capability; and a transceiver unit, configured to send the higher layer signaling to a terminal. The processing unit is further configured to determine downlink control information (DCI), where the DCI is used to instruct the terminal to determine a transmission timing value in the at least one transmission timing set, and the determined transmission timing value is a slot that the terminal is instructed to use when sending feedback information; and the transceiver unit is further configured to send the DCI to the terminal. In addition, the base station is further configured to implement all or some of the method steps in any one of the first to the fifth implementations of the first aspect.

According to a fourth aspect, a terminal is further provided. The terminal includes: a transceiver unit, configured to receive higher layer signaling and downlink control information (DCI), where the higher layer signaling includes at least one transmission timing set used to indicate a transmission timing value, each of the at least one transmission timing set includes at least one transmission timing value, the DCI is used to instruct the terminal to determine a transmission timing value in the at least one transmission timing set, and the at least one transmission timing set is related to at least one of the following factors: a subcarrier width, a TDD manner, and a terminal capability; and a processing unit, configured to determine the transmission timing value in the at least one transmission timing set based on the DCI. The transceiver unit is further configured to send feedback information in a slot corresponding to the determined transmission timing value. In addition, the terminal is further configured to implement all or some of the method steps in the first or the second implementation of the second aspect.

According to a fifth aspect, a transmission timing information sending system is further provided. The system includes a base station and at least one terminal, wherein the base station is configured to configure higher layer signaling, where the higher layer signaling includes at least one transmission timing set used to indicate a transmission timing value, each of the at least one transmission timing set includes at least one transmission timing value, and the at least one transmission timing set is related to at least one of the following factors: a subcarrier width, a TDD manner, and a terminal capability; and send the higher layer signaling to the terminal, and to determine downlink control information (DCI), where the DCI is used to instruct the terminal to determine a transmission timing value in the at least one transmission timing set, and the determined transmission timing value is a slot that the terminal is instructed to use when sending feedback information; and send the DCI to the terminal, and wherein the terminal is configured to: receive the higher layer signaling and the downlink control information (DCI) from the base station, determine the transmission timing value in the at least one transmission timing set based on the DCI, and send the feedback information in the slot corresponding to the determined transmission timing value.

According to a sixth aspect, a computer storage medium is further provided. The computer storage medium can store a program, and the program may perform some and all of the steps in the implementations of the transmission timing information sending method and the transmission timing information receiving method.

BRIEF DESCRIPTION OF THE DRAWINGS

To describe the technical solutions in the embodiments of this application more clearly, the following briefly describes the accompanying drawings required for describing the embodiments.

DETAILED DESCRIPTION OF ILLUSTRATIVE EMBODIMENTS

To facilitate subsequent description and describe this application clearly, the following first briefly describes concepts possibly to be used in this application.

A communications system in the embodiments of this application may be an LTE system or a 5G system. The communications system includes at least one terminal and at least one network device.

The terminal may be a device providing information and/or data connectivity to a user, a handheld device having a wireless connection function, or another processing device connected to a wireless modem. The terminal may communicate with one or more core networks by using a radio access network (RAN). The terminal may be a mobile terminal such as a mobile phone (or referred to as a "cellular" phone) or a computer with a mobile terminal, for example, a portable, pocket-sized, handheld, computer built-in, or in-vehicle mobile apparatus that exchanges voice and/or data with the radio access network. For example, the terminal may be a device such as a personal communications service (PCS) phone, a cordless telephone set, a Session Initiation Protocol (SIP) phone, a wireless local loop (WLL) station, or a personal digital assistant (PDA). The terminal may also be referred to as a system, a subscriber unit (SU), a subscriber station (SS), a mobile station (MS), a remote station (RS), an access point (AP), a remote terminal (RT), an access terminal (AT), a user terminal (UT), a user agent (UA), a user device, or user equipment (UE). The network device may be a base station, an enhanced base station, a relay station with a scheduling function, a device with a base station function, or the like. The base station may be an evolved NodeB (eNB) in an LTE system, or may be a base station in another system. This is not limited in the embodiments of this application. The following is described by using a base station as an example.

In the embodiments of this application, transmission timing is used to indicate an interval between receiving, by a terminal, downlink data sent by a base station and feeding back uplink acknowledgement information to the base station by the terminal, or is used to indicate an interval between sending uplink scheduling information to the terminal by the base station and sending uplink data by the terminal. The transmission timing is, for example, HARQ timing.

In the embodiments of this application, the fed-back uplink acknowledgement information or feedback information may include acknowledgement (ACK) information and negative acknowledgement (NACK) information. The base station determines, based on received ACK/NACK information, whether to retransmit a data packet. If the base station receives ACK information, the base station initiates transmission of a new data packet. If the base station receives NACK information fed back by the terminal, the base station initiates a data packet retransmission operation.

Figure 1:
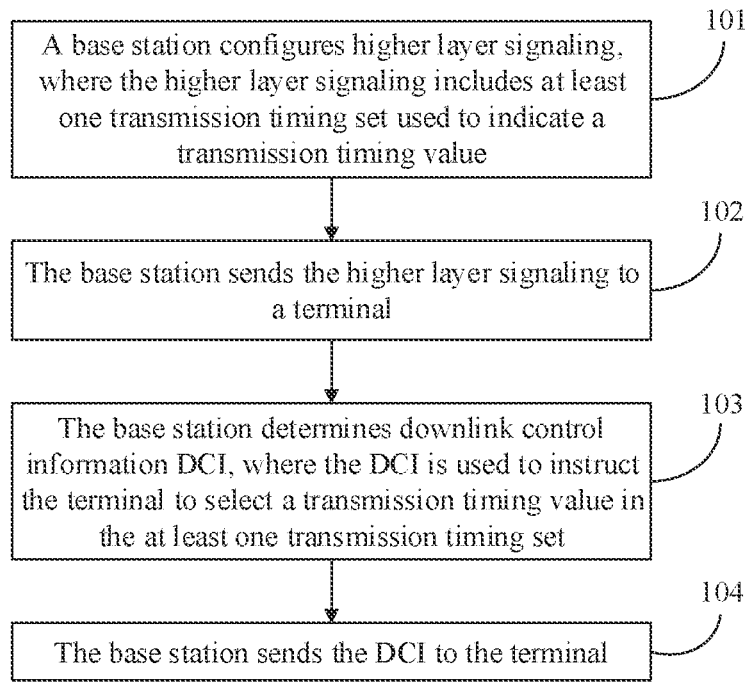
FIG. 1 is a schematic flowchart of a transmission timing information sending method according to an embodiment of this application.

An embodiment of this application provides a transmission timing information sending method, to improve flexibility of a transmission timing configuration and reduce overheads of DCI indication information. As shown in FIG. 1, the method includes the following steps.

Step 101: A base station configures higher layer signaling, where the higher layer signaling includes at least one transmission timing set used to indicate a transmission timing value, each of the at least one transmission timing set includes at least one transmission timing value, and the at least one transmission timing set is related to at least one of the following factors: a subcarrier width, a TDD manner, a terminal capability, a system uplink downlink configuration, and the like.

The system uplink downlink configuration is a combination relationship of slot types of slots in a system. For example, every 10 consecutive slots constitute one group, and each slot in the group is an all-uplink slot, an all-downlink slot, a primary uplink slot, or a primary downlink slot.

The TDD manner covers a semi-static TDD system and a dynamic TDD system. In the semi-static TDD system, a slot type of each slot is indicated by using higher layer signaling or determined in a predefined manner. In the dynamic TDD system, a slot type of each slot is notified by using physical layer signaling. The slot type includes an all-uplink slot, an all-downlink slot, a primary uplink slot, and a primary downlink slot.

That a base station configures higher layer signaling specifically includes: The base station obtains, through division, different transmission timing sets based on one or more factors of the terminal capability, the subcarrier width, the TDD manner, and the system uplink downlink configuration. Each transmission timing set includes at least one transmission timing value. For example, the higher layer signaling includes a first transmission timing set and/or a second transmission timing set, each value in the set is a transmission timing value.

A transmission timing value in the first transmission timing set and a transmission timing value in the second transmission timing set may be different values corresponding to different services, different values corresponding to different terminal capabilities, or different values corresponding to different TDD manners or different values corresponding to different uplink downlink subframe configurations. For example, the first transmission timing set is configured for a terminal with a strong data processing capability, and the second transmission timing set is configured for a terminal with a weak data processing capability; or the first transmission timing set is configured for a system of a first configuration based on an uplink downlink configuration, and the second transmission timing set is configured for a system of a second configuration based on an uplink downlink configuration, where the first configuration is different from the second configuration; or the system configures the first transmission timing set for a semi-static TDD system and configures the second transmission timing set for a dynamic TDD system. In addition, different transmission timing sets may be determined and configured based on a time-frequency resource in which to-be-sent DCI is located.

The transmission timing value may be information about an interval between sending downlink data to a terminal by the base station and receiving, by the base station, uplink acknowledgement information sent by the terminal, or information about an interval between sending uplink scheduling information to the terminal by the base station and sending uplink data by the terminal. The information about the interval includes a quantity of slots. For example, the base station sends downlink data in a subframe or a slot n, and the terminal sends uplink acknowledgement information in a subframe or a slot n+k, where a value of k is a value in the transmission timing value set configured in the higher layer signaling.

Optionally, when the terminal is in a specified case, the at least one transmission timing set is invalid, and the value in the transmission timing set is no longer applicable. The specified case may be, for example, a cell handover or RRC connection re-setup.

Optionally, a timing value in the transmission timing set further includes at least one default value. When the at least one transmission timing set is invalid, the terminal determines a transmission timing value based on the default value. For example, the transmission timing value is equal to the default value.

Optionally, the default value may be predefined by the system. To be specific, the default value may be a value that can be learned by the base station and the terminal in advance, or a value that can be configured. For example, the terminal may determine the value based on received system information or information related to random access. The information related to random access may be a second message or a fourth message sent by the base station when the terminal performs initial access.

Setting the default value can resolve the following technical problem: After the at least one timing set used by the terminal becomes invalid, data may not be effectively transmitted if the base station uses a new timing value and the terminal still uses an invalid timing value.

Step 102: The base station sends the higher layer signaling to a terminal.

Step 103: The base station determines downlink control information (DCI), where the DCI is used to instruct the terminal to determine a transmission timing value in the at least one transmission timing set, and the determined transmission timing value is a slot that the terminal is instructed to use when sending feedback information.

Specifically, the DCI includes an information field indicating the transmission timing value in the first transmission timing set and the transmission timing value in the second transmission timing set. For example, the DCI includes an information field indicating a transmission timing value, and the information field is used to indicate a specific transmission timing value in a transmission timing set. In this case, the DCI includes a two-bit indication field used to indicate, to the terminal, an interval for feeding back acknowledgement information of downlink data scheduled in a current subframe. If a value of the DCI is "00", a corresponding transmission timing value in the set is k1. When the terminal receives the DCI, it indicates that the transmission timing value is "00", and the terminal feeds back acknowledge information such as an ACK/NACK to the base station in a slot or a subframe n+k1.

A transmission timing information indication manner is jointly using a format of the DCI and a first information field to indicate the transmission timing value. A specific indication process includes: The DCI format of the DCI includes a first information field, and the base station indicates a transmission timing value in a transmission timing set based on the first information field, where, when there are two or more transmission timing sets, the DCI is used to instruct the terminal to determine a transmission timing value in these transmission timing sets, and wherein the base station determines one of the at least one transmission timing set based on the DCI format of the DCI, where the DCI format includes a first information field, and the first information field is used to indicate a transmission timing value in the set with a binding relationship; or performs sending on a control channel time-frequency resource occupied by the DCI, and determines at least one transmission timing set in the at least one transmission timing set based on the control channel time-frequency resource.

Another transmission timing information indication manner is jointly using a first information field and a second information field to indicate the transmission timing value. Specifically, a format of the DCI may be used, the DCI format of the DCI includes a first information field, and a transmission timing value in a transmission timing set is indicated based on the first information field. When two or more transmission timing sets are included, the DCI is used to instruct the terminal to determine a transmission timing value in these transmission timing sets; in addition, the DCI format of the DCI may further include a second information field, where the second information field is used to determine the transmission timing set in the at least one transmission timing set.

Optionally, when a timing value in the transmission timing set further includes at least one default value as described in step 101, in step 103, optionally, that the base station determines downlink control information (DCI), where the DCI is used to instruct the terminal to determine a transmission timing value in the at least one transmission timing set, includes: An indication field in the DCI instructs the terminal to use the default value. For example, as described in the foregoing example, the DCI includes a two-bit indication field used to indicate, to the terminal, an interval for feeding back transmission acknowledgement information of downlink data scheduled in a current subframe. If a value of the DCI is "00", a corresponding transmission timing value in the set is determined based on the default value. When indication information is "01,10, 11", the indication information is used to instruct the terminal to determine a transmission timing value based on remaining values in the timing set.

Step 104: The base station sends the DCI to the terminal.

When the base station sends the DCI, a slot indicated by indication information in the DCI needs to include an uplink transmission resource that can be used to transmit an uplink ACK/NACK, and a specific time-frequency resource location for transmitting the uplink ACK/NACK may have a binding relationship with scheduled downlink transmission data. For example, frequency domain resource information of the uplink ACK/NACK has a binding relationship with a frequency domain location of a first physical resource block (PRB) of a scheduled downlink transmission resource.

The base station may send the DCI to the terminal over a primary control channel, or send the DCI to the terminal over both a primary control channel and a secondary control channel. The DCI is located on the secondary control channel.

Figure 2:
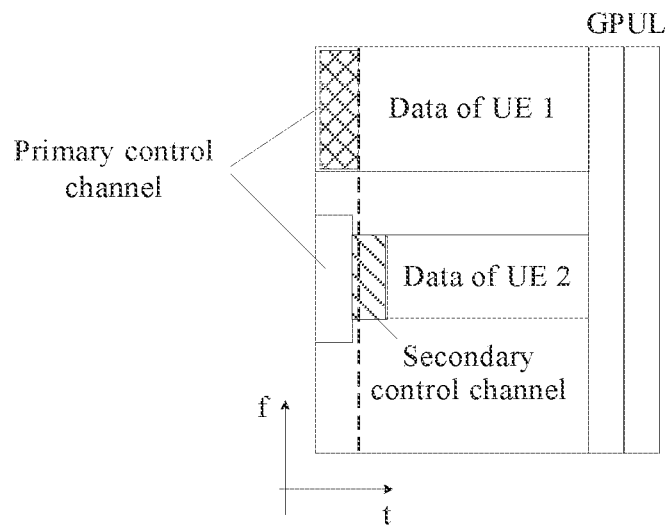
FIG. 2 is a schematic structural diagram of time-frequency resource locations of a primary control channel and a secondary control channel according to an embodiment of this application.

As shown in FIG. 2, FIG. 2 is a schematic structural diagram of the two levels of control channels. The primary control channel is located in a control area of an entire slot or subframe, and the secondary control channel is located in a data area of the subframe. If the DCI is sent jointly over the primary control channel and the secondary control channel, the primary control channel includes resource scheduling indication information, and the resource scheduling indication information is used to indicate a time-frequency resource location of the DCI on the secondary control channel. The secondary control channel is used to carry information indicating a transmission timing value.

According to the method for indicating transmission timing by jointly using higher layer signaling and downlink control information (DCI), the at least one transmission timing value set is configured in the higher layer signaling in advance, and the DCI is used to instruct to select the specific transmission timing value in the set. Value elements in each transmission timing set are determined based on factors such as a current service status of a system and a subframe configuration; therefore, when the terminal receives the higher layer signaling including the at least one transmission timing set, the base station only needs to use the DCI to carry an indication of the transmission timing value of the terminal. This avoids carrying relatively long information bits, and reduces control information overheads.

Further, the process of configuring a correspondence between the DCI and the transmission timing set by the base station includes the following cases:

In a case, the base station establishes a binding relationship with the at least one transmission timing set based on the DCI format, so that the terminal can determine a transmission timing set based on the DCI format. The DCI format includes a first information field. The first information field is used to indicate a transmission timing value in the set with the binding relationship. For example, the first information field includes a specific value in a first set.

In another case, a binding relationship is established between the DCI format and two or more transmission timing sets. To be specific, the DCI format includes a first information field and a second information field. The first information field has a binding relationship with a transmission timing set, and the first information field is used to indicate the transmission timing set with the binding relationship in a plurality of sets. The second information field is used to indicate a transmission timing value in the set with the binding relationship.

In still another case, the base station may alternatively establish a binding relationship with the at least one transmission timing set based on a control channel time-frequency resource. Specifically, the control channel time-frequency resource includes a plurality of areas, each area is used to transmit the DCI, and each area is corresponding to a transmission timing set. After receiving the DCI, the terminal determines, based on information about a control channel time-frequency resource area in which the DCI is located, a transmission timing set corresponding to the DCI.

In still another case, the base station establishes a binding relationship with different transmission timing sets based on a length of information bits included in the DCI format of the DCI. For example, a binding relationship is established between the first transmission timing set and DCI whose information bit length is less than a threshold, and a binding relationship is established between the second transmission timing set and DCI whose bit length is greater than or equal to the threshold.

It should be noted that the foregoing only lists several binding relationship establishment cases, and the foregoing cases are not limitative. The base station may alternatively establish a binding relationship between the transmission timing set and the DCI based on factors such as a subcarrier width and an uplink downlink subframe configuration. For example, the base station determines the DCI based on a subcarrier width, the DCI is used to indicate a transmission timing value corresponding to the subcarrier width, and the DCI has a binding relationship with a transmission timing set corresponding to the subcarrier width.

To improve flexibility of transmission timing value indication, a transmission timing value in the transmission timing set varies with the DCI.

Further, the at least one transmission timing set in the higher layer signaling includes a first subcarrier set, and a transmission timing value in the first subcarrier set depends on a subcarrier width. When the subcarrier width changes, the corresponding transmission timing value in the first subcarrier set also changes.

For example, at a first moment, the base station determines first DCI based on a current subcarrier width, and the first DCI is used to indicate a transmission timing value in the first subcarrier set; at a moment following the first moment, for example, a second moment, the base station generates second DCI based on a subcarrier width of the second moment. The base station flexibly indicates transmission timing by configuring the higher layer signaling to adjust the transmission timing set and by using the indication of the DCI.

Alternatively, if two or more transmission timing sets are related to the subcarrier width, a manner of configuring and establishing a binding relationship may be configuring different transmission timing sets based on different subcarrier widths at different moments. Two transmission timing sets: a first subcarrier set and a second subcarrier set, are used as an example. A transmission timing value in the first subcarrier set is determined based on a first subcarrier width, and a transmission timing value in the second subcarrier set is determined based on a second subcarrier width. When a system configuration is the first subcarrier width, the base station determines DCI, and the DCI is corresponding to the first subcarrier set. When a system configuration is the second subcarrier width, the base station determines DCI, and the DCI is corresponding to the second subcarrier set. The first subcarrier width and the second subcarrier width may be configured in a same system in a frequency division multiplex manner or a time division multiplex manner. In this embodiment, the example in which the base station determines, based on a subcarrier width, a transmission timing value indicated in the DCI further improves flexibility of information indication.

Figure 3:
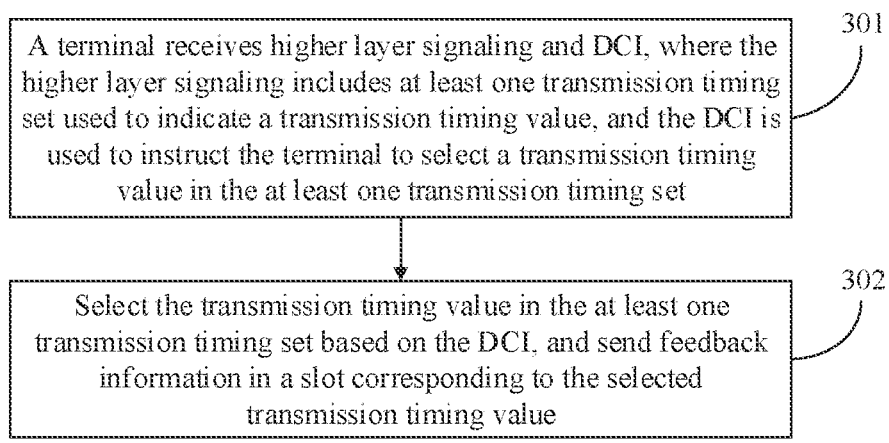
FIG. 3 is a schematic flowchart of a transmission timing information receiving method according to an embodiment of this application.
Figure 4:
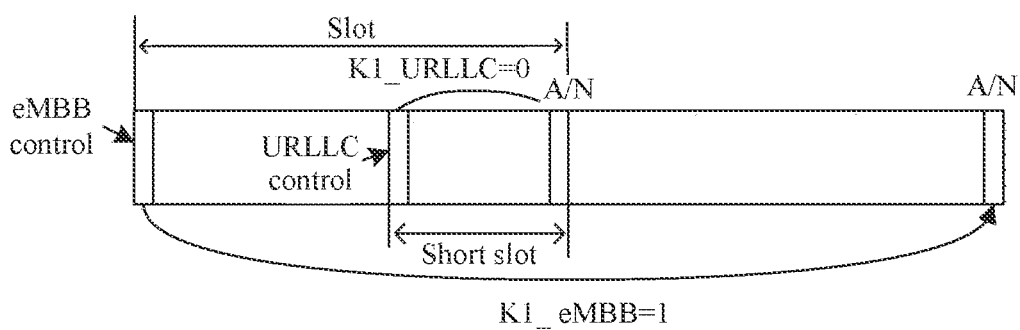
FIG. 4 is a schematic diagram of indicating different transmission timing based on different service types according to an embodiment of this application.

In another embodiment of this application, a transmission timing information receiving method is further provided on a receive side. As shown in FIG. 3, the method includes the following steps.

Step 301: A terminal receives higher layer signaling and downlink control information (DCI) from a base station.

The higher layer signaling includes at least one transmission timing set used to indicate a transmission timing value. Each of the at least one transmission timing set includes at least one transmission timing value. The DCI is used to instruct the terminal to determine a transmission timing value in the at least one transmission timing set. The at least one transmission timing set is related to at least one of the following factors: a subcarrier width, a TDD manner, a terminal capability, and the like.

Further, the terminal may first receive the higher layer signaling sent by the base station and then receive the DCI. Alternatively, the terminal simultaneously receives the higher layer signaling and the DCI that are sent by the base station. Alternatively, if the higher layer signaling has been pre-configured in the terminal or obtained by the terminal, the DCI sent by the base station may be directly received, with no need to obtain the higher layer signaling before receiving the DCI.

A process in which the base station divides the higher layer signaling and configures the DCI is the same as the method described in the foregoing embodiment. Details are not repeated herein.

Step 302: The terminal determines a transmission timing value in at least one transmission timing set based on the DCI, and sends, to the base station, data information and/or feedback information in a slot corresponding to the determined transmission timing value.

A possible implementation is: After obtaining the higher layer signaling and the DCI, the terminal first determines a transmission timing set in the at least one transmission timing set based on a format of the DCI, and then determines the transmission timing value in the determined transmission timing set based on indication information carried in an information field included in the DCI. The information field includes indication information such as a bit value, resource allocation, and a modulating method.

If the terminal obtains two or more pieces of DCI, the terminal may determine, based on a binding relationship between each DCI and transmission timing set, a transmission timing set corresponding to each DCI, and then determine a transmission timing value in the set based on an information field in the DCI. For example, the terminal receives two pieces of DCI in one slot, denoted first DCI and second DCI, formats of the two pieces of DCI are different, and an information field included in the first DCI is different from an information field included in the second DCI. The information field in the first DCI includes information such as resource allocation, a modulation method, and transmission timing information. The information field in the second DCI includes a modulation method, transmission timing information, and the like.

During determining of a correspondence between the DCI and the transmission timing set, a possible case is that a length of information bits included in the first DCI is different from a length of information bits included in the second DCI. When configuring the transmission timing set, the base station may establish a binding relationship between the transmission timing set and the DCI based on an information bit length. For example, a binding relationship is established between a first set and DCI whose information bit length is less than a specified threshold, and DCI whose information bit length is greater than the threshold is bound to a second set. Then, a transmission timing value in the first set and a transmission timing value in the second set are determined based on information carried in the first DCI and information carried in the second DCI.

In another possible case, the first DCI or the second DCI includes an information field used to indicate a first transmission timing set or a second transmission timing set corresponding to DCI in which the information field is located. Specifically, the information field includes one-bit indication information; when a bit value is "0", the terminal determines the first transmission timing set; and when a bit value is "1", the terminal determines the second transmission timing set.

Alternatively, if the terminal obtains the DCI over a primary control channel and a secondary control channel, the determining a transmission timing value in at least one transmission timing set based on the DCI includes obtaining, by the terminal, resource scheduling indication information from the primary control channel, determining a time-frequency resource location of the secondary control channel based on the resource scheduling indication information and determining the transmission timing value in the at least one transmission timing set based on the DCI carried in the time-frequency resource location of the secondary control channel.

According to the method provided in this embodiment, of the at least one timing value set is first configured by using the higher layer signaling, and then the specific timing value is indicated by using the physical layer control indication information DCI. In this way, the transmission timing value is flexibly configured, and a plurality of timing relationships can be dynamically indicated together with the physical layer indication information.

In addition, each DCI is bound to at least one transmission timing set. The binding may be performed based on the DCI format, the DCI information bit length, the subcarrier width, and the like, thereby establishing an implicitly indicated relationship between the DCI and the transmission timing value set. This reduces DCI signaling overheads.

Figure 5:
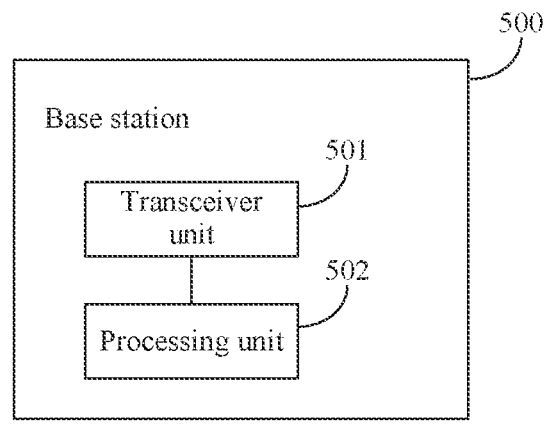
FIG. 5 is a schematic structural diagram of a base station according to an embodiment of this application.

Referring to FIG. 5, FIG. 5 is a schematic structural diagram of an embodiment of a base station according to this application. The base station may be configured to perform the transmission timing information sending method in the embodiment related to FIG. 1.

As shown in FIG. 5, the base station includes a transceiver unit 501 and a processing unit 502. In addition to the transceiver unit 501 and the processing unit 502, the base station may include other units or modules such as a storage unit.

In an embodiment, the processing unit 502 is configured to configure higher layer signaling, where the higher layer signaling includes at least one transmission timing set used to indicate a transmission timing value, each of the at least one transmission timing set includes at least one transmission timing value, and the at least one transmission timing set is related to at least one of the following factors: a subcarrier width, a TDD manner, a terminal capability, and the like.

The transceiver unit 501 is configured to send the higher layer signaling to a terminal.

The processing unit 502 is further configured to determine downlink control information (DCI), where the DCI is used to instruct the terminal to determine a transmission timing value in the at least one transmission timing set, and the determined transmission timing value is a slot that the terminal is instructed to use when sending feedback information.

The transceiver unit 501 is further configured to send the DCI to the terminal.

The transmission timing value includes information about an interval between sending downlink data to the terminal by the base station and receiving, by the base station, uplink acknowledgement information sent by the terminal, or information about an interval between sending uplink scheduling information to the terminal by the base station and sending uplink data by the terminal. The information about the interval includes a quantity of slots.

Optionally, that the DCI is used to instruct the terminal to determine a transmission timing value in the at least one transmission timing set includes: a DCI format of the DCI includes a first information field, and a transmission timing value in a transmission timing set is indicated based on the first information field. When the at least one transmission timing set is at least two transmission timing sets, that the DCI is used to instruct the terminal to determine a transmission timing value in the at least one transmission timing set further includes one of the at least one transmission timing set is determined based on the DCI format of the DCI, the DCI format includes a first information field, and the first information field is used to indicate a transmission timing value in the set with a binding relationship; or sending is performed on a control channel time-frequency resource occupied by the DCI, and at least one of the at least two transmission timing set is determined based on the control channel time-frequency resource.

Optionally, that the DCI is used to instruct the terminal to determine a transmission timing value in the at least one transmission timing set includes: a DCI format of the DCI includes a first information field, and a transmission timing value in a transmission timing set is indicated based on the first information field. When the at least one transmission timing set is at least two transmission timing sets, that the DCI is used to instruct the terminal to determine a transmission timing value in the at least one transmission timing set further includes: the DCI format of the DCI further includes a second information field, and one of the at least one transmission timing set is determined based on the second information field.

Optionally, the processing unit 502 is further configured to establish a binding relationship with the at least one transmission timing set based on the DCI format. The DCI format includes a first information field, and the first information field is used to indicate a transmission timing value in the set with the binding relationship.

Optionally, the processing unit 502 is further configured to establish a binding relationship with at least two transmission timing sets based on the DCI format. The format of the DCI includes a first information field and a second information field, the first information field is used to indicate that there is a binding relationship between the DCI and one of the at least two transmission timing sets, and the second information field is used to indicate a transmission timing value in the set with the binding relationship.

Optionally, the at least one transmission timing set includes a first subcarrier set, and a transmission timing value in the first subcarrier set depends on a subcarrier width.

Optionally, the at least one transmission timing set includes a first subcarrier set and a second subcarrier set, a transmission timing value in the first subcarrier set is determined based on a first subcarrier width, a transmission timing value in the second subcarrier set is determined based on a second subcarrier width, and at least one of the transmission timing value in the first subcarrier set is different from the transmission timing value in the second subcarrier set.

Optionally, the transceiver unit 501 is specifically configured to: send the DCI to the terminal over a primary control channel, or send the DCI to the terminal over a primary control channel and a secondary control channel. The DCI is located on the secondary control channel.

Optionally, the storage unit is configured to: store the higher layer signaling and the generated DCI information, and store data or information from the terminal, for example, ACK/NACK information.

According to the base station and the terminal provided in this embodiment, the higher layer signaling that is configured on a base station side includes the at least one transmission timing value set, and elements in the transmission timing value set are flexibly configured based on a current service of a system and a subframe configuration. The terminal determines a transmission timing value during current transmission, for example, a HARQ timing value, by receiving the downlink control information (DCI). In addition to the transmission timing value, the DCI further includes downlink or uplink data scheduling indication information. Transmission timing is sent with scheduling information. User equipment may determine information about an interval between receiving downlink data and feeding back an ACK/NACK, or user equipment may determine information about an interval between receiving uplink scheduling information and sending uplink data.

Figure 6:
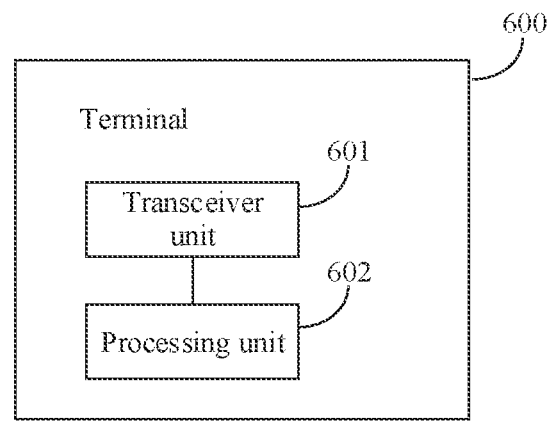
FIG. 6 is a schematic structural diagram of a terminal according to an embodiment of this application.

Referring to FIG. 6, FIG. 6 is a schematic structural diagram of an embodiment of a terminal according to this application. The terminal may be configured to perform the transmission timing information receiving method in the embodiment related to FIG. 3.

As shown in FIG. 6, the terminal may include a transceiver unit 601 and a processing unit 602. In addition to the transceiver unit 601 and the processing unit 602, the terminal may include other units or modules such as a storage unit.

In an embodiment, the transceiver unit 601 is configured to receive higher layer signaling and downlink control information (DCI). The higher layer signaling includes at least one transmission timing set used to indicate a transmission timing value. Each of the at least one transmission timing set includes at least one transmission timing value.

The DCI is used to instruct the terminal to determine a transmission timing value in the at least one transmission timing set. The at least one transmission timing set is related to at least one of the following factors: a subcarrier width, a TDD manner, a terminal capability, and the like.

The processing unit 602 is configured to determine the transmission timing value in the at least one transmission timing set based on the DCI.

The transceiver unit 601 is further configured to send feedback information in a slot corresponding to the determined transmission timing value.

Optionally, the processing unit 602 is specifically configured to: determine one of the at least one transmission timing set based on a format of the DCI, and determine the transmission timing value in the determined transmission timing set based on indication information carried in an information field included in the DCI.

Optionally, if the terminal obtains the DCI over a primary control channel and a secondary control channel, the processing unit 602 is specifically configured to: obtain resource scheduling indication information from the primary control channel; determine a time-frequency resource location of the secondary control channel based on the resource scheduling indication information; and determine the transmission timing value in the at least one transmission timing set based on the DCI carried in the time-frequency resource location of the secondary control channel.

Figure 7:
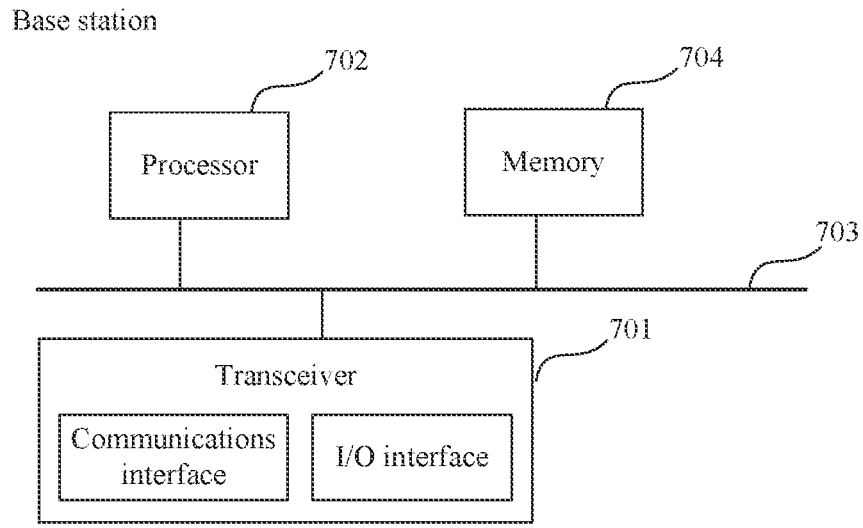
FIG. 7 is another schematic diagram of a hardware structure of a base station according to an embodiment of this application.

Referring to FIG. 7, FIG. 7 is a schematic structural diagram of an embodiment of a base station according to this application. The terminal may be the base station in any of the foregoing embodiments and is configured to perform steps in the transmission timing information sending method in the foregoing embodiments.

As shown in FIG. 7, the base station may include a transceiver 701, a processor 702, a communications bus 703, and a memory 704. The transceiver 701 includes at least one communications interface and/or I/O interface.

The processor 702 is a control center of the base station, and is connected to various parts of the entire terminal by using various interfaces and lines; and runs or executes a software program and/or module stored in the memory 704 and invokes data stored in the memory, to perform various functions of the base station and/or process data. The processor 702 may include an integrated circuit (IC), for example, a single packaged IC, or may be formed by connecting a plurality of packaged ICs having a same function or different functions. For example, the processor may include only a central processing unit (CPU), or may be a combination of a GPU, a digital signal processor (DSP), and a control chip (such as a baseband chip) in a transceiver module. In this implementation of this application, the CPU may be a single operation core or a multi-operation core.

The transceiver 701 is configured to establish a communication channel, so that the terminal base station is connected to a receiving terminal by using the communication channel, to implement data transmission between the base station and the terminal. The transceiver may include a communications module such as a wireless local area network (WLAN) module, a Bluetooth module, or a baseband module, and a radio frequency (RF) circuit corresponding to the communications module, and is configured to perform wireless local area network communication, Bluetooth communication, infrared communication, and/or cellular communications system communication, for example, Wideband Code Division Multiple Access (WCDMA) and/or high speed downlink packet access (HSDPA). The transceiver is configured to control communication of components in the terminal, and can support direct memory access.

In this embodiment of this application, functions to be implemented by the transceiver 701 may be implemented by the transceiver unit of the base station or may be implemented by controlling a transceiver unit by the processor 702. Functions to be implemented by the processor 702 may be implemented by the processing unit 502.

Figure 8:
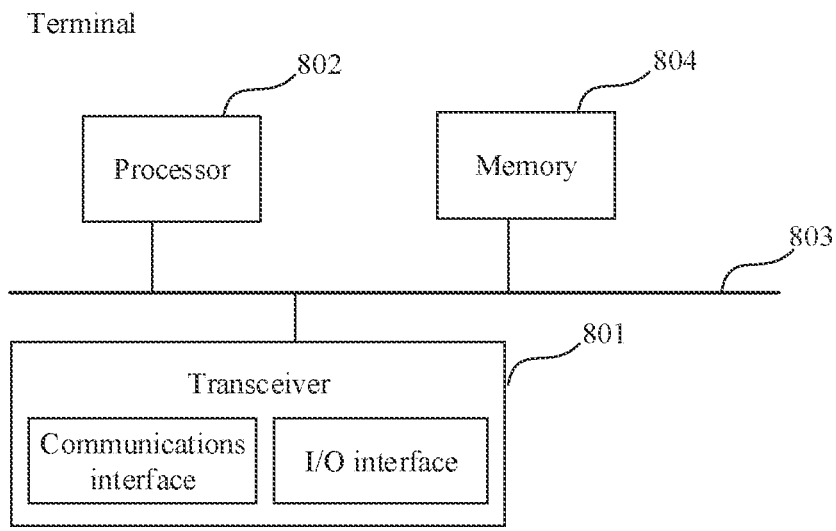
FIG. 8 is another schematic diagram of a hardware structure of a terminal according to an embodiment of this application.

Referring to FIG. 8, FIG. 8 is a schematic structural diagram of an embodiment of a network-side terminal according to this application. The terminal may be the network-side device in any of the foregoing embodiments and is configured to perform steps in the method in the foregoing embodiments.

The terminal may include a transceiver 801, a processor 802, a communications bus 803, and a memory 804. The transceiver 801 includes at least one communications interface and/or I/O interface.

The transceiver 801 may be configured to: receive higher layer signaling and DCI that are sent by a base station, and send feedback information, for example, an ACK/NACK message, to the base station. The transceiver may be controlled by the processor to send data to the base station or another network-side device.

The processor 802 is a control center of the terminal, and is connected to various parts of the entire network-side device by using various interfaces and lines; and runs or executes a software program and/or module stored in the memory and invokes data stored in the memory, to perform various functions of the terminal and/or process data. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 804 is configured to store the obtained higher layer signaling and DCI information. The memory may include a volatile memory, for example, a random access memory (RAM), or may include a non-volatile memory, for example, a flash memory, a hard disk drive (HDD), or a solid-state drive (SSD). The memory may further include a combination of the foregoing types of memories. The memory may store a program or code. The processor in the network element may implement functions of the network element by executing the program or code.

An embodiment of this application provides a computer storage medium, configured to store a computer software instruction for use by the transmission timing information sending method and the transmission timing information receiving method provided in the foregoing embodiments. The computer software instruction includes a program designed to execute the foregoing method embodiments. The stored program is executed to send and receive transmission timing information.

A person skilled in the art should understand that the embodiments of the present invention may be provided as a method, an apparatus (a device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, an optical memory, and the like) that include computer-usable program code. The computer program is stored/distributed in a proper medium and is provided with other hardware or used as a part of hardware, or may be distributed in another form, such as by using the Internet or another wired or wireless telecommunications system.

For same or similar parts between the embodiments in this specification, mutual citation is performed. Especially, the device embodiments are essentially similar to the method embodiments, and therefore are described briefly; for related pails, refer to descriptions in the method embodiments.

The foregoing descriptions are implementations of this application, but are not intended to limit the protection scope of this application.

The invention claimed is:

1. A method comprising:
sending higher layer signaling to a terminal,
wherein the higher layer signaling indicates at least one transmission timing set,
wherein each of the at least one transmission timing set indicates at least one transmission timing value, each of the at least one transmission timing value being an interval between a downlink transmission and an uplink transmission, and
wherein each of the at least one transmission timing set is related to a data processing capability of the terminal; and
sending downlink control information (DCI) to the terminal, wherein the DCI indicates a transmission timing value in the at least one transmission timing set.

2. The method according to claim 1, wherein the transmission timing value is indicated by an information field included in a DCI format of the DCI, and the transmission timing value is included in a transmission timing set of the at least one timing set, the transmission timing set corresponding to the DCI format.

3. The method according to claim 1, wherein each of the at least one transmission timing value is an interval between a downlink transmission of uplink scheduling indication information and an uplink transmission of data.

4. The method according to claim 1, wherein each of the at least one transmission timing value is an interval between a downlink transmission of data and an uplink transmission of acknowledgement feedback information.

5. The method according to claim 1, wherein each of the at least one transmission timing set is further related to a subcarrier width of the terminal.

6. The method according to claim 1, wherein the sending the DCI to the terminal comprises:
based on the at least one transmission timing set being valid, sending the DCI to the terminal; and
wherein the method further comprises:
based on the at least one transmission timing set being invalid, determining that a default transmission timing value is to be used.

7. A method comprising:
receiving higher layer signaling from a base station,
wherein the higher layer signaling indicates at least one transmission timing set,
wherein each of the at least one transmission timing set indicates at least one transmission timing value, each of the at least one transmission timing value being an interval between a downlink transmission and an uplink transmission, and
wherein each of the at least one transmission timing set is related to a data processing capability of a terminal; and receiving downlink control information (DCI) from the base station, wherein the DCI indicates a transmission timing value in the at least one transmission timing set.

8. The method according to claim 7, wherein the transmission timing value is indicated by an information field included in a DCI format of the DCI, and the transmission timing value is included in a transmission timing set of the at least one timing set, the transmission timing set corresponding to the DCI format.

9. The method according to claim 7, wherein each of the at least one transmission timing value is an interval between a downlink transmission of uplink scheduling indication information and an uplink transmission of data.

10. The method according to claim 7, wherein each of the at least one transmission timing value is an interval between a downlink transmission of data and an uplink transmission of acknowledgement feedback information.

11. The method according to claim 7, wherein each of the at least one transmission timing set is further related to a subcarrier width of the terminal.

12. The method according to claim 7, wherein the receiving the DCI from the base station comprises:
based on the at least one transmission timing set being valid, receiving the DCI from the base station; and
wherein the method further comprises:
based on the at least one transmission timing set being invalid, determining that a default transmission timing value is to be used.

13. An apparatus comprising:
a processor; and
a non-transitory memory storing programming for execution by the processor, the programming including instructions to:
send higher layer signaling to a terminal, wherein the higher layer signaling indicates at least one transmission timing set, wherein each of the at least one transmission timing set indicates at least one transmission timing value, each of the at least one transmission timing value being an interval between a downlink transmission and an uplink transmission, and wherein each of the at least one transmission timing set is related to a data processing capability of the terminal; and
send downlink control information (DCI) to the terminal, wherein the DCI indicates a transmission timing value in the at least one transmission timing set.

14. The apparatus according to claim 13, wherein the transmission timing value is indicated by an information field included in a DCI format of the DCI, and the transmission timing value is included in a transmission timing set of the at least one timing set, the transmission timing set corresponding to the DCI format.

15. The apparatus according to claim 13, wherein each of the at least one transmission timing value is an interval between a downlink transmission of uplink scheduling indication information and an uplink transmission of data.

16. The apparatus according to claim 13, wherein each of the at least one transmission timing value is an interval between a downlink transmission of data and an uplink transmission of acknowledgement feedback information.

17. The apparatus according to claim 13, wherein each of the at least one transmission timing set is further related to a subcarrier width of the terminal.

18. The apparatus according to claim 13, wherein the programming further includes instructions to:
based on the at least one transmission timing set being valid, sending the DCI to the terminal; and based on the at least one transmission timing set being invalid, determining that a default transmission timing value is to be used.

19. An apparatus comprising:
a processor; and
a non-transitory memory storing programming for execution by the processor, the programming including instructions to:
receive higher layer signaling from a base station, wherein the higher layer signaling indicates at least one transmission timing set, wherein each of the at least one transmission timing set indicates at least one transmission timing value, each of the at least one transmission timing value being an interval between a downlink transmission and an uplink transmission, and wherein each of the at least one transmission timing set is related to a data processing capability of a terminal; and
receive downlink control information (DCI) from the base station, wherein the DCI indicates a transmission timing value in the at least one transmission timing set.

20. The apparatus according to claim 19, wherein the transmission timing value is indicated by an information field included in a DCI format of the DCI, and the transmission timing value is included in a transmission timing set of the at least one timing set, the transmission timing set corresponding to the DCI format.

21. The apparatus according to claim 19, wherein each of the at least one transmission timing value is an interval between a downlink transmission of uplink scheduling indication information and an uplink transmission of data.

22. The apparatus according to claim 19, wherein each of the at least one transmission timing value is an interval between a downlink transmission of data and an uplink transmission of acknowledgement feedback information.

23. The apparatus according to claim 19, wherein each of the at least one transmission timing set is further related to a subcarrier width of the terminal.

24. The apparatus according to claim 19, wherein the programming further includes instructions to:
based on the at least one transmission timing set being valid, receiving the DCI from the base station; and
based on the at least one transmission timing set being invalid, determining that a default transmission timing value is to be used.

* * * * *

UNITED STATES PATENT AND TRADEMARK OFFICE
CERTIFICATE OF CORRECTION

PATENT NO. : 11,678,401 B2
APPLICATION NO. : 17/215689
DATED : June 13, 2023
INVENTOR(S) : Zhang et al.

Page 1 of 1

It is certified that error appears in the above-identified patent and that said Letters Patent is hereby corrected as shown below:

In the Specification

In Column 17, Line 12, delete "pails," and insert -- parts, --.

Signed and Sealed this
Twenty-ninth Day of August, 2023

Katherine Kelly Vidal
*Director of the United States Patent and Trademark Office*